Jan. 22, 1957 H. H. LORENZ 2,778,581

REEL FOR TAPE RECORDER AND PLAYER

Filed May 6, 1954 2 Sheets-Sheet 1

INVENTOR.
HOWARD H. LORENZ
BY
Lockwood, Galt, Woodard & Smith
ATTORNEYS

Jan. 22, 1957 H. H. LORENZ 2,778,581

REEL FOR TAPE RECORDER AND PLAYER

Filed May 6, 1954 2 Sheets-Sheet 2

INVENTOR.
HOWARD H. LORENZ

BY

Lockwood, Galt, Woodard, & Smith
ATTORNEYS

United States Patent Office 2,778,581

Patented Jan. 22, 1957

2,778,581

REEL FOR TAPE RECORDER AND PLAYER

Howard Herman Lorenz, Benton Harbor, Mich., assignor to V-M Corporation, Benton Harbor, Mich., a corporation of Michigan Application May 6, 1954, Serial No. 427,959

10 Claims. (Cl. 242—70)

The present invention relates to tape recorders and players, and more particularly to sound-tape reels therefor.

Reels conventionally used in conjunction with tape recorders and players are provided with some type of constructional facility for attaching the end of the tape to the reel hub just prior to winding the tape on the reel. One popular tape-fastening arrangement is a radial slot which extends inwardly of the hub from the periphery. The end of the tape is merely inserted into this slot, and then held manually therein while the reel is revolved two or three times to secure the tape in place. It is necessary to hold the tape end in this slot manually until the tape winding is started, because otherwise without such starting the tape will slip from the slot.

It often happens that time is of the essence in fastening a tape to a reel for a playing or recording operation, whereupon any difficulty encountered in securing the tape end to the reel becomes a major factor, especially where a slippage occurs and it is necessary to repeat the insertion of the tape end into the slot. In any event, this prior art reel construction conduces to a certain amount of tediousness and consumption of time in fastening the tape to the reel, and it is this particular problem with which the present invention is primarily concerned.

In view of the foregoing, it is an object of this invention to provide a tape-locking arrangement for a reel which eliminates the aforementioned difficulties.

It is another object of this invention to provide a tape-attaching arrangement for a reel which does not require preliminary rotation of the reel for initially securing the tape thereto.

It is a further object of this invention to provide a slot arrangement in a reel which is readily accessible to the threading of the tape therethrough for the attachment of the tape to the reel.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 4:
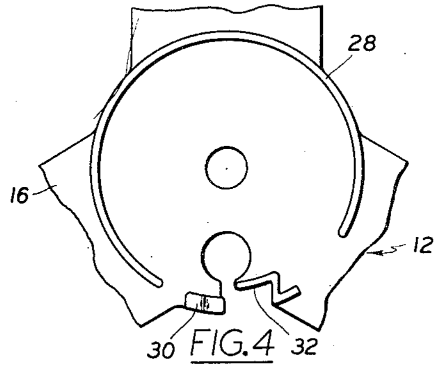
Figs. 4 and 5 are fragmentary views respectively of a second section of the reel of Fig. 1.
Figure 5:
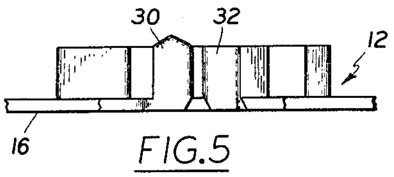

Referring to the drawings, the reel is comprised of two reel sections, an outer section generally indicated by the reference numeral 10 (Figs. 2 and 3) and an inner section generally indicated by the reference numeral 12 (Figs. 4 and 5) which are complementarily formed to fit together in a complete reel assembly as illustrated in Figs. 1, 6, 7 and 8. These sections 10 and 12 are characterized as "inner" and "outer" sections for the reason that a portion of one fits inside a corresponding portion of the other. This is described in further detail hereinafter.

Each section 10, 12 is provided with the usual side flanges 14, 16 respectively, each flange preferably being comprised of the usual spokes 18 and angularly spaced openings 20. The significance of these openings 20 will be explained in more detail hereinafter.

Figure 2:
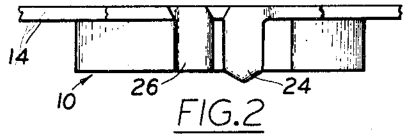
Figs. 2 and 3 are corresponding fragmentary end and side views of one section of the reel of Fig. 1.
Figure 6:
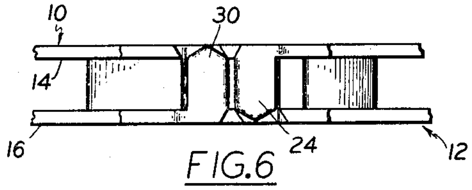
Fig. 6 is a fragmentary end view showing the two sections properly assembled together.
Figure 3:
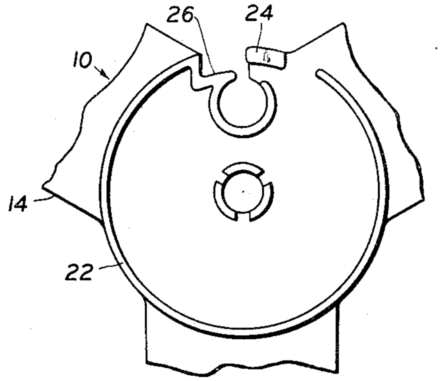

Coaxially extending from the outer section 10 is a tubular hub flange 24 which is substantially continuous in peripheral extent but which is interrupted to provide an axial projection 24 and a radially inset recess 26 (Figs. 2 and 3).

The inner section 12 (Figs. 4 and 5) is similarly provided with a hub flange 28 sized to fit snugly inside the flange 22 of section 10 and peripherally interrupted to provide axial projection 30 and radial recess 32. It should be noted that the radius of the outer surface of the projection 30 is equal to the radius of the hub 22. By fitting the hub 28 inside the hub 22, the extension 30 is received by the recess 26 and the projection 24 is similarly received by the recess 32. The two recesses 26 and 32, respectively, are sufficiently deep to provide a clearance groove or slot between them and the respective projection 30 and 24. The respective clearance slots are indicated by the reference numerals 34 and 36, as seen more clearly in Fig. 8.

Figure 1:
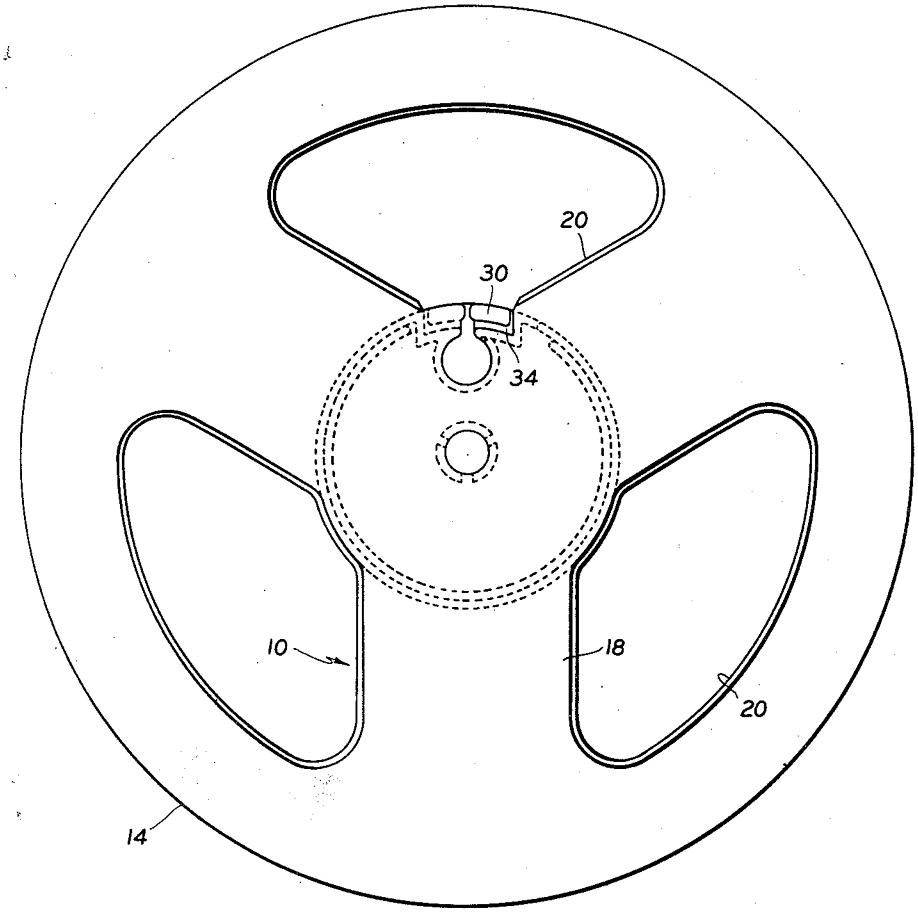
Fig. 1 is a side elevation of one embodiment of this invention.

As will be seen more clearly in Fig. 1, one of the side flange openings 20 is positioned to coincide with the two slots 34 and 36, whereupon each slot opens laterally through the respective side of the reel.

In fastening a tape end to the hub, it is only necessary to thread or insert the tape into one of the slots 34, 36. By so doing, the tape is securely fastened to the hub, whereupon succeeding rotation of the reel serves to wind the tape thereon. It is not necessary to rotate the reel two or three revolutions manually in order to insure that the tape is secured, nor is it necessary to manually hold the tape end in the particular slot 34, 36 during the initial rotation of the reel. Thus, it is seen that the tedious threading and securing operations encountered in the use of prior art reels is entirely eliminated.

Since it is desirable to use both longitudinal edges of the tape for recording and playing, it is necessary that the reel be usable from either side. For accomplishing this requirement, the slot 34 is formed to open through one lateral side of the hub while the slot 36 is formed to open through the opposite side. As will be seen in Figs. 6 and 7, this is easily accomplished by forming the respective projections 30, 24 and recesses 26 32, respectively, to be oppositely disposed, such that mere assembly of the two reel sections 10 and 12 automatically provides the opposite slots 34 and 36.

Figure 7:
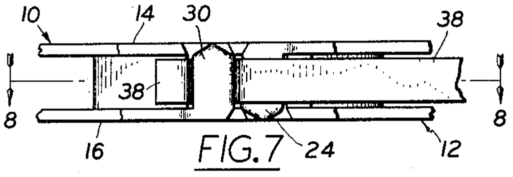
Fig. 7 is a view similar to Fig. 6 except with a section of tape fastened thereto.
Figure 8:
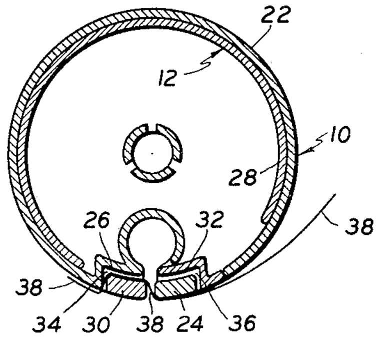
Fig. 8 is a fragmental sectional view taken substantially on line 8—8 of Fig. 7.

Figs. 7 and 8 show a tape 38 properly threaded through the slot 34. The same tape may obviously be threaded through the other slot 36.

In operation of a tape recorder and player which utilizes the reel of this invention, when a reel loaded with tape is completely run out, the tape end merely slips through the respective slot 34, 36 and passes through the machine in a conventional manner.

Thus, while this invention provides positive and reliable means for securing a tape end to a reel for starting machine operation, such means also releases the tape from a supply reel when the tape on such reel is completely payed out.

What is claimed is:

1. A reel for a tape recorder and player comprising a hub about which a tape may be wound, and a tape-receiving slot in said hub which opens through the outer periphery of said hub at two circumferentially spaced points, said slot being composed of two separated radial portions joined by a circumferential portion, the radial portions emerging at said points respectively at abrupt angles with the hub periphery, said slot also being open on one lateral side of said hub whereby a segment of tape may be inserted into said slot and wound around said hub.

2. A reel for a tape recorder and player comprising a hub about which a tape may be wound, and a tape-receiving slot in said hub which opens through the outer periphery of said hub at two circumferentially spaced points, said slot being composed of two radial portions joined by a third circumferential portion, said radial portions being substantially straight and emerging at said points respectively at relatively abrupt angles with the hub periphery, said slot also being open on one lateral side of said hub whereby a segment of tape may be inserted into said slot and passed around said hub, and two sides, one of said sides having an opening in registry with said slot whereby an operator may gain access to said slot for inserting a tape.

3. A reel of the character defined by claim 1 including two such slots which laterally open on opposite sides of said hub whereby a tape may be alternatively inserted into a selected one of said slots.

4. A reel for a tape recorder and player comprising a hub about which a tape may be wound, and a tape-receiving slot in said hub which extends in substantially a straight line from a first point on the hub periphery a predetermined distance radially inwardly, then in a circumferential direction for a predetermined distance, and then turns radially outwardly to emerge through said periphery at a second point spaced from said first point, said slot being continuous whereby a segment of tape may be inserted therethrough.

5. A reel for a tape recorder and player comprising a hub about which a tape may be wound, and a tape-receiving slot in said hub which extends at an abrupt angle to the hub periphery from a first point on the hub periphery a predetermined distance radially inwardly, then in a circumferential direction for a predetermined distance, and then turns radially outwardly to emerge through said periphery at a second point spaced from said first point, said slot being continuous whereby a segment of tape may be inserted therethrough, said slot also being open laterally of said hub for accepting said segment from the one hub side.

6. A reel for a tape recorder and player comprising a hub about which a tape may be wound, and a tape-receiving slot in said hub which extends in a substantially straight line from a first point on the hub periphery a predetermined distance radially inwardly, then in a circumferential direction for a predetermined distance, and then turns radially outwardly to emerge through said periphery at a second point spaced from said first point, said slot being continuous whereby a segment of tape may be inserted therethrough, said slot also being open laterally of said hub for accepting said segment from the one hub side, and side flanges on said hub, one flange having an opening in registry with the lateral extent of said slot whereby an operator has ready access to said slot for inserting said tape thereinto.

7. A reel for a tape recorder and player comprising a hub about which a tape may be wound, and a tape-receiving slot in said hub which extends in a substantially straight line from a first point on the hub periphery a predetermined distance radially inwardly, then in a circumferential direction for a predetermined distance, and then turns radially outwardly to emerge through said periphery at a second point spaced from said first point, said slot being continuous whereby a segment of tape may be inserted therethrough, said slot also being open laterally of said hub for accepting said segment from the one hub side, said hub being provided with a second slot similar to the first slot but opening on the opposite lateral side of said hub whereby a tape segment may be inserted thereinto from such opposite side of said hub.

8. A reel of the character described comprising inner and outer hub sections, each section having a disc-like side, a coaxially extending hub flange for each section, one hub flange fitting inside the other hub flange for forming the reel hub, one hub flange being circumferentially interrupted to provide an axially extending projection and the other hub flange being similarly interrupted to provide a recess for receiving said projection, said recess extending radially inwardly a distance sufficient to provide a clearance slot between it and the projection which opens laterally through one hub side, said slot thereby being adapted to receive a segment of tape.

9. A reel of the character described comprising inner and outer hub sections, each section having a disc-like side, a coaxially extending hub flange for each section, one hub flange fitting inside the other hub flange for forming the reel hub, one hub flange being circumferentially interrupted to provide an axially extending projection and the other hub flange being similarly interrupted to provide a recess for receiving said projection, said recess extending radially inwardly a distance sufficient to provide a clearance slot between it and the projection which opens laterally through one hub side, said one hub flange being further interrupted to provide a second radial recess and said other flange having a second axial projection which fits within said second recess, said second recess being spaced from said second projection to provide a second clearance slot, said second slot opening through the opposite lateral side of said hub, said hub thereby being adapted to receive alternatively a segment of tape from either of its sides.

10. A reel for a tape recorder and player comprising a hub and side flanges, said hub having a first full radial slot, said hub further having two additional radial slots on opposite circumferential sides of said first slot, said two slots opening through opposite lateral edges of said hub but being closed by the other hub edges, the laterally opening slots being joined with said first slot by two circumferential laterally opening slots respectively.

References Cited in the file of this patent

UNITED STATES PATENTS

| | | |
|---|---|---|
| 1,013,882 | Lasker | Jan. 9, 1912 |
| 2,467,607 | Bates | Apr. 19, 1949 |

FOREIGN PATENTS

| | | |
|---|---|---|
| 673,012 | Germany | Mar. 14, 1939 |